United States Patent
Babbush et al.

(10) Patent No.: US 10,922,617 B2
(45) Date of Patent: Feb. 16, 2021

(54) EMBEDDING ELECTRONIC STRUCTURE IN CONTROLLABLE QUANTUM SYSTEMS

(71) Applicant: President and Fellows of Harvard College, Cambridge, MA (US)

(72) Inventors: Ryan Babbush, Cambridge, MA (US); Peter Love, Somerville, MA (US); Alan Aspuru-Guzik, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/535,770

(22) Filed: Aug. 8, 2019

(65) Prior Publication Data

US 2020/0242501 A1 Jul. 30, 2020

Related U.S. Application Data

(63) Continuation of application No. 15/034,596, filed as application No. PCT/US2014/063825 on Nov. 4, 2014, now Pat. No. 10,417,574.

(60) Provisional application No. 61/900,119, filed on Nov. 5, 2013.

(51) Int. Cl.
*G06N 10/00* (2019.01)
*G06F 15/82* (2006.01)

(52) U.S. Cl.
CPC ............ *G06N 10/00* (2019.01); *G06F 15/82* (2013.01)

(58) Field of Classification Search
CPC ..................................................... G06N 10/00
USPC ............................................................. 706/15
See application file for complete search history.

(56) References Cited

U.S. PATENT DOCUMENTS

| | | | |
|---|---|---|---|
| 7,781,754 B2 | 8/2010 | Loss et al. | |
| 8,190,553 B2 | 5/2012 | Routt | |
| 10,417,574 B2 | 9/2019 | Babbush et al. | |
| 2008/0065573 A1* | 3/2008 | Macready | ............... G06N 7/08 706/19 |
| 2009/0121215 A1 | 5/2009 | Choi | |

OTHER PUBLICATIONS

Aspuru-Guzik et al., "Simulated quantum computation of molecular energies," Sci. 309(5741):1704-1707 (2005).
(Continued)

*Primary Examiner* — David R Vincent
(74) *Attorney, Agent, or Firm* — Foley Hoag LLP

(57) ABSTRACT

Generating a computing specification to be executed by a quantum processor includes: accepting a problem specification that corresponds to a second-quantized representation of a fermionic Hamiltonian, and transforming the fermionic Hamiltonian into a first qubit Hamiltonian including a first set of qubits that encode a fermionic state specified by occupancy of spin orbitals. An occupancy of any spin orbital is encoded in a number of qubits that is logarithmic in the number of spin orbitals, and a parity for a transition between any two spin orbitals is encoded in a number of qubits that is logarithmic in the number of spin orbitals. An eigenspectrum of a second qubit Hamiltonian, including the first set of qubits and a second set of qubit, includes a low-energy subspace and a high-energy subspace, and an eigenspectrum of the first qubit Hamiltonian is approximated by a set of low-energy eigenvalues of the low-energy subspace.

13 Claims, 5 Drawing Sheets

(56) References Cited

OTHER PUBLICATIONS

Babbush et al., "Resource efficient gadgets for compiling adiabatic quantum optimization problems," Annalen der Physik 525(10-11):877-888 (2012).
Bravyi et al., "Fermionic Quantum Computation," Annals of Physics 298(1):210-226 (2002).
Cao et al., "Towards experimentally realizable hamiltonian gadgets," ArXiv e-prints 1211(2555):1-44 (2013).
Jordan et al., "Perturbative Gadgets at Arbitrary Orders," Phys. Rev. A. 77:(6):23-29 (2008).
Kassal et al., "Simulating chemistry using quantum computers," Ann. Rev. Phys. Chem. 62:185-207 (2010).
Kempe et al., "The complexity of the local Hamiltonian problem," FSTTCS, 3328:372-383 (2004).
Oliveira et al., "The complexity of quantum spin systems on a two-dimensional square lattice," Quant. Inf. Comp. 8(10):900-924 (2008).
Seeley et al., "The Bravyi-Kitaev transformation for quantum computation of electronic structure," J. Chem. Phys. 137(22):10.1163 (2012).
Whitfield et al., "Simulation of electronic structure Hamiltonians using quantum computers," Mol. Phys. 109(5):735-750 (2011).

\* cited by examiner

US 10,922,617 B2

EMBEDDING ELECTRONIC STRUCTURE IN CONTROLLABLE QUANTUM SYSTEMS

CROSS-REFERENCE TO RELATED APPLICATIONS

This application is a continuation of U.S. application Ser. No. 15/034,596, filed May 5, 2016, which is the U.S. National Stage of International Application No. PCT/US2014/063825, filed on Nov. 4, 2014, published in English, which claims the benefit of U.S. Provisional Application No. 61/900,119, filed on Nov. 5, 2013. The entire teachings of the above application(s) are incorporated herein by reference.

STATEMENT AS TO FEDERALLY SPONSORED RESEARCH

This invention was made with government support under contract M1144-201167-DS awarded by the United States Department of Defense, and PHY-0955518 awarded by the National Science Foundation. The government has certain rights in the invention.

BACKGROUND

This invention relates to embedding electronic structure in controllable quantum systems.

Adiabatic quantum computing (AQC) works by changing the Hamiltonian of a controllable quantum system from an initial Hamiltonian whose ground state is easy to prepare into a Hamiltonian whose ground state encodes the solution of a computationally interesting problem. The speed of this algorithm is determined by the adiabatic theorem of quantum mechanics which states that an eigenstate remains at the same position in the eigenspectrum if a perturbation acts on the system sufficiently slowly. Simply embedding a computational problem in a Hamiltonian suitable for AQC does not ensure an efficient solution. The required runtime for the adiabatic evolution depends on the energy gap between the ground state and first excited state at the smallest avoided crossing.

AQC has been applied to classical optimization problems such as search engine ranking, protein folding, and machine learning. There is an equivalence between a large set of such computational problems (problems in the complexity class NP) and a set of models in classical physics (e.g., classical Ising models with random coupling strengths). For some AQC-based quantum computers, solutions of these computational problems are based on the NP-Completeness of determining the ground state energy of classical Ising spin glasses. In general, quantum computing, including AQC, does not necessarily provide efficient solutions to NP-Complete problems in the worst case. However, there may exist sets of instances of some NP-Complete problems for which AQC can find the ground state efficiently, but which defy efficient classical solution by any means.

Some quantum computers implemented as a controllable quantum systems that use some principles of AQC, but deviate from the requirement of being strictly confined to the ground state at zero temperature and may have considerable thermal mixing of higher lying states. Such quantum computers are sometimes referred to as quantum annealing computers. Medium scale (e.g., 500 qubit) quantum annealing computers have been investigated for many problems to determine if and by how much quantum annealing on the classical Ising model outperforms approaches using optimized codes on classical hardware for computing the same ground state solution.

Another form of quantum computing is the gate model (also known as the circuit model) of quantum computing. The gate model is based on a generalization of the classical gate model where a classical bit (i.e., a Boolean value of 0 or 1) is manipulated using logic gates. In the quantum gate model, a quantum bit or "qubit" (i.e., a quantum superposition of quantum basis states, such as a state representing a "0" and a state representing a "1") is manipulated using quantum gates. While there is a form of computational equivalence for certain computations between the gate model and the AQC model, such that the computations can be performed in comparable amount of time using either model, different problems can be mapped more easily into a computation more suitable for one than the other. Also, the quantum systems that realize the gate model or the AQC model (including quantum annealing computers) may be very different. The molecular electronic structure problem (also known as "quantum chemistry") is an example of a problem that has been mapped to the gate model, but not to the AQC model.

SUMMARY

In one aspect, in general, a specification compiler (e.g., software including instructions for causing a computer to perform a transformation procedure to transform a problem specification) is used to configure a programmable computer, which then implements the transformation procedure from a problem specification to a computing specification suitable for execution on a quantum computer. The quantum computer can be implemented as a certain type of controllable quantum system on which a quantum annealing approach can be used to solve the specified problem. As will be described in more detail below, approaches described in this application address technical problems stemming from one or both of: (1) requirements for expressing certain types of problem specifications (e.g., molecular electronic structure problems) as suitable computing specifications, and (2) limitations on the form of computing specification that may be executed by such quantum computers. Approaches described herein address these technical problems by transforming an initial problem specification according to technical considerations regarding how certain aspects of the problem specification can be physically realized using the available types of interactions between hardware elements of the quantum computer that represent qubits. These technical considerations are incorporated into the compilation procedure used by the compiler for the quantum computer.

In another aspect, in general, a method, for use in transforming a problem specification into a computing specification to be executed by a quantum processor that has limited types of couplings between hardware elements representing quantum bits (qubits), includes: (1) accepting a problem specification that corresponds to a second-quantized representation of a fermionic Hamiltonian associated with a model of a molecular system including one or more fermions and a particular number of spin orbitals associated with the one or more fermions; (2) transforming the fermionic Hamiltonian into a first qubit Hamiltonian that includes a first set of qubits that encode a fermionic state specified by occupancy of the spin orbitals, where a transition between two spin orbitals is associated with a parity of a sum of occupancies across spin orbitals between the two spin orbitals, the transforming including representing second-quantized fermionic operators within the fermionic Hamiltonian as interactions between qubits of the first set, where: (a) an occupancy of any spin orbital is encoded in a number of qubits that is greater than one and less than a logarithmic function of the total number of spin orbitals, and (b) a parity for a transition between any two spin orbitals is encoded in a number of qubits that is greater than one and less than a logarithmic function of the total number of spin orbitals; and (3) generating a second qubit Hamiltonian that includes the first set of qubits and a second set of qubits, where an eigenspectrum of the second qubit Hamiltonian includes a low-energy subspace characterized by a set of low-energy eigenvalues and a high-energy subspace characterized by a set of high-energy eigenvalues that don't overlap with the set of low-energy eigenvalues, and an eigenspectrum of the first qubit Hamiltonian is approximated by the set of low-energy eigenvalues.

Aspects may include one or more of the following features.

Perturbations used to generate the second qubit Hamiltonian excludes from the second Hamiltonian interactions in the first Hamiltonian that violate one or more constraints, and adds interactions between qubits of the second set.

The one or more constraints include constraining interactions between qubits in the second qubit Hamiltonian so that each interaction is between no more than two qubits.

The one or more constraints include constraining interactions between qubits in the second qubit Hamiltonian so that each interaction corresponds to one of the limited types of couplings between hardware elements of the quantum processor.

The limited types of couplings between hardware elements of the quantum processor constrain the interactions to exclude any interactions represented by a term in the second qubit Hamiltonian that includes a Pauli operator of a first type.

Excluding any interactions represented by a term in the second qubit Hamiltonian that includes a Pauli operator of the first type includes: excluding any interactions represented by a term in the first qubit Hamiltonian that comprises a product of an odd number of the Pauli operator of the first type.

The Pauli operator of the first type is a Pauli operator containing an imaginary number.

The second-quantized fermionic operators within the fermionic Hamiltonian includes fermionic annihilation and creation operators.

Transforming the fermionic Hamiltonian into a first qubit Hamiltonian is performed using a Bravyi-Kitaev construction.

The first set of qubits corresponds to a first set of the hardware elements, and the second set of qubits corresponds to a second set of the hardware elements.

The method further comprises configuring the quantum processor according to the computing specification.

The method further comprises: operating the quantum processor configured according to the computing specification; and providing a specification of a problem solution determined from a state of the quantum processor after the operating.

Operating the quantum processor comprises operating said processor according to a quantum annealing procedure.

In another aspect, in general, a quantum computing system comprises a quantum processor configured to perform all the steps of any one of the methods above.

In another aspect, in general, software comprises instructions stored on a non-transitory computer-readable medium for causing a compiler to perform all the steps of any one of the methods above.

Aspects can have one or more of the following advantages.

The ability to make exact quantum chemical calculations on nontrivial systems would revolutionize chemistry. While seemingly intractable for classical algorithms, quantum computers can efficiently perform such computations. There has been substantial interest in quantum algorithms for quantum chemistry using the gate model (involving Trotterization and quantum phase estimation). However, such gate-model approaches are not yet experimentally feasible for practical chemistry problems. The techniques described herein enable a different approach to quantum chemistry based on the quantum adiabatic algorithm. Approaches based on AQC, such as quantum annealing, do not require Trotterization, phase estimation, or logic gates. Generally, the techniques described herein enable scalable quantum simulation of fermionic systems using adiabatic quantum computing. Such simulation of fermionic systems enables efficient computation of various molecular properties.

One of the technical challenges of mapping a quantum chemistry problem to an AQC model would be embedding the problem into the state of an appropriate controllable quantum system such as a quantum annealing computer. Embedding a problem to be solved into the state of a controllable quantum system involves mapping the problem to a Hamiltonian (i.e., an operator corresponding to the total energy of the system, whose eigenspectrum represents possible energy states of the system) that can be realized in the hardware elements of that quantum system. Also, mapping to such a realizable Hamiltonian requires careful consideration of the available properties of the quantum system. One property is the "control precision" of the Hamiltonian, which is the dynamic range of field values that must be resolved in order to measure the intended eigenspectrum with a desired accuracy. This property is especially important for molecular electronic structure Hamiltonians as chemists are typically interested in acquiring chemical accuracy (0.04 eV). Control precision is often the limiting factor when a Hamiltonian contains terms with coefficients that vary by several orders of magnitude. Other properties include the number of qubits available as well as the connectivity and type of qubit couplings.

In some embodiments, a compiling procedure maps electronic structure Hamiltonians to 2-body qubit Hamiltonians with a small set of physically realizable couplings. As described in more detail below, combining the Bravyi-Kitaev construction (which maps fermions to qubits, as described in more detail below) with "perturbative gadgets" (which reduce the Hamiltonian to 2-body interactions of particular types, as described in more detail below) satisfies precision requirements on the coupling strengths and provides an efficient mapping (i.e., a number of ancilla qubits that scale polynomially in the problem size). For some embodiments, the required set of controllable interactions includes only two types of interaction beyond the Ising interactions required to apply the quantum adiabatic algorithm to combinatorial optimization problems. The mapping used by the compiler may also be of interest to chemists directly as it defines a dictionary from electronic structure to spin Hamiltonians with physical interactions, which can be used in a variety of quantum computing applications.

Other features and advantages of the invention are apparent from the following description, and from the claims.

DESCRIPTION

Figure 1:
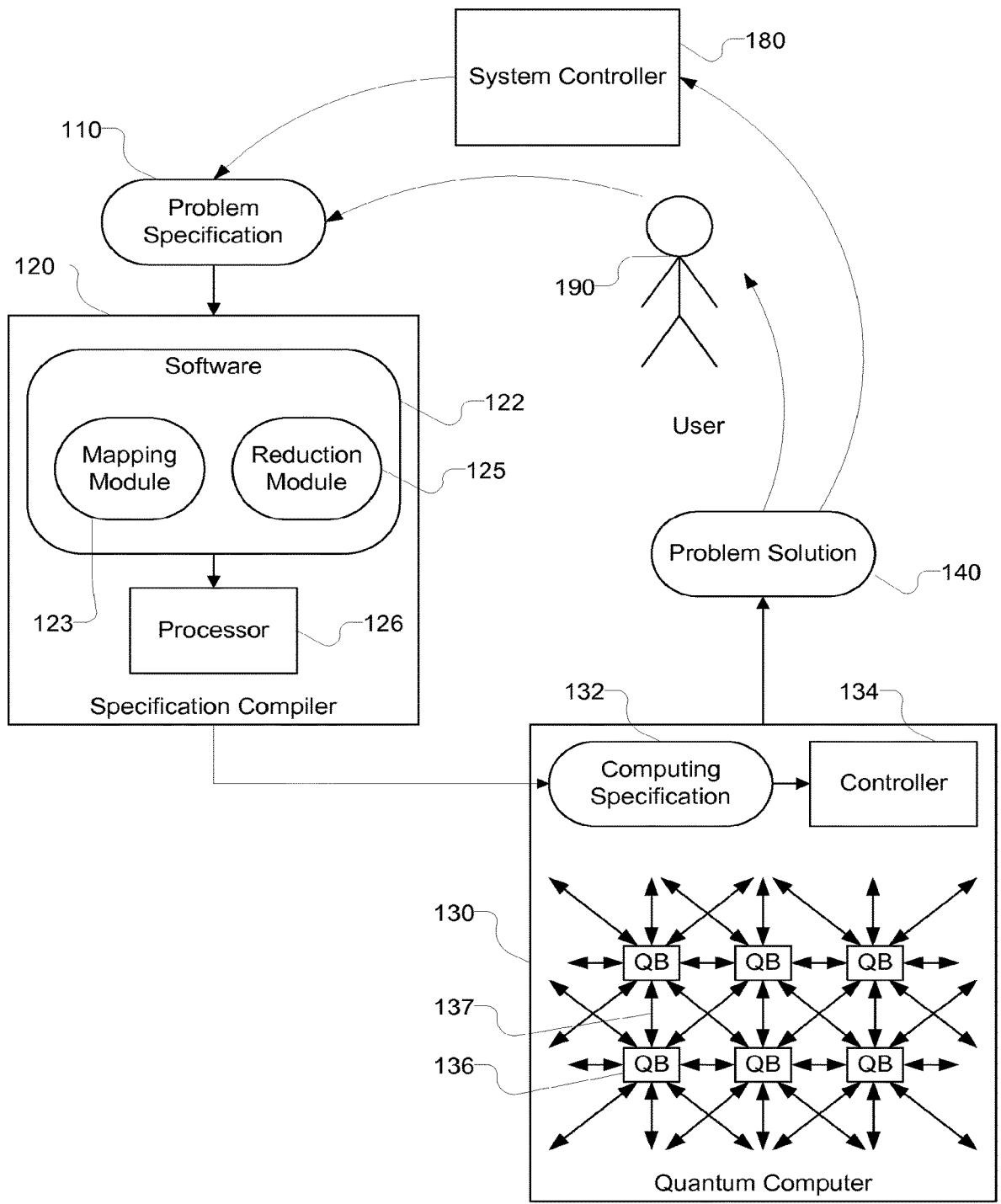
FIG. 1 is a block diagram of a computing system.

Quantum chemistry applied to molecular systems is perhaps the broadest class of problems on which quantum simulation of interacting fermions could have an impact. Finding the energy of electrons interacting in the Coulomb potential of a set of fixed nuclei of an atom or molecule defines the electronic structure problem. This problem is computationally expensive for classical computers because the cost of directly solving for the eigenvalues of the exact electronic Hamiltonian grows exponentially with the problem size.

One may divide quantum simulation algorithms into two classes: those that address statics and compute ground state properties, and those that address dynamics, and simulate time evolution of the wavefunction. It is clear that the simulation of time evolution is exponentially more efficient on quantum computers, with significant implications for the simulation of chemically reactive scattering. The computation of ground state properties naturally requires preparation of the ground state. This can be done adiabatically, or by preparation of an ansatz for the ground state. Adiabatic preparation of the ground state within a gate model simulation requires time evolution of the wavefunction, which is efficient. However, the length of time for which one must evolve is determined, as for all adiabatic algorithms, by the minimum energy gap between ground and first excited states along the adiabatic path. This is unknown in general. Similarly, a successful ansatz state must have significant overlap with the true ground state, and guarantees of this are unavailable in general.

The worst case complexity of generic model chemistries (e.g. local fermionic problems studied with density functional theory) has been shown to be in the quantum mechanical equivalent of NP-Complete, QMA-Complete. However, the subset of these generic models that correspond to stable molecules, or to unstable configurations of chemical interest such as transition states, is small and structured. Just as with adiabatic optimization, it does not matter if molecular electronic structure is QMA-Complete so long as the average instance can be solved (or even approximated) efficiently. In this case we also have considerable heuristic evidence that molecules are able to find their ground state configurations rapidly: these are the configurations in which they naturally occur. Similarly, unstable transition states of interest occur in natural processes. Given that simulation of time evolution on a quantum computer is efficient, we conjecture that simulation of the natural processes that give rise to these states will also be practical.

The proofs that Local Hamiltonian (a decision problem capturing the complexity of finding the ground state energy) is QMA-Complete relies on the construction of various specific Hamiltonians that can represent any possible instance of any problem in QMA. In general, these Hamiltonians possess couplings between more than two qubits. Hamiltonians that contain many-body interactions of order k and lower are referred to as k-local Hamiltonians; experimentally programmable couplings are 2-local. The original formulation by Kitaev was (log n)-local, he then reduced this to 5-local and that result was subsequently reduced to 3-local. To reduce 3-local Hamiltonians to 2-local Hamiltonians "perturbative gadgets" can be used to embed a k-local Hamiltonian in a subspace of a 2-local Hamiltonian using ancilla qubits.

The compiler described herein uses a procedure that is scalable in the number of ancilla qubits, enabling the application of a quantum annealing algorithm (or other AQC-based algorithm) to a controllable quantum system that encodes a molecular electronic Hamiltonian. This scalability is useful because it limits the additional number of hardware elements that may be needed in a quantum processor, as described below. The problem specification provided as input to the compiler may be in the form of a second quantized representation of molecular electronic structure. A second quantized representation is one in which the Hamiltonian is represented with fermionic creation and annihilation operators (i.e., also known as raising and lowering operators for raising or lowering the energy of a quantum system, respectively).

In an example embodiment of the compilation procedure described herein three steps are used to convert an input problem specification to an output computing specification suitable for execution on a quantum computer. The first step includes converting the fermionic Hamiltonian of the input problem specification into a qubit Hamiltonian using the Bravyi-Kitaev transformation. The Bravyi-Kitaev transformation is a technique for representing second-quantized fermionic operators as interactions between qubits that encode fermionic states by storing both the occupancy and parity of each fermion non-locally, in a logarithmically upper-bounded number of qubits. The Jordan-Wigner transformation is another technique for representing second-quantized fermionic operators as interactions between qubits. However, it is recognized herein that use of the Bravyi-Kitaev transformation instead of the Jordan-Wigner transformation is necessary for avoiding exponential control precision requirements in an a practical system. The Bravyi-Kitaev transformation was originally applied to solving electronic structure problems in the context of the gate model, as described, for example, in a paper by Seely, J., Richard, M., and Love, P. entitled "The Bravyi-Kitaev transformation for quantum computation of electronic structure," incorporated herein by reference. However, it is recognized herein that it can be adapted for use in solving electronic structure problems in the context of the AQC model.

The second step includes using a formulation of "perturbative gadgets," which is a technique for embedding the eigenspectrum of a target Hamiltonian in the low energy subspace of a more constrained Hamiltonian by introducing a strongly gapped ancilla system and then choosing a set of constrained couplings to realize effective interactions as virtual transitions between ancilla states that appear in a perturbative expansion for the effective low energy Hamiltonian. This technique allows removal all terms involving YY couplings in a single gadget application (as used herein, X, Y and Z denote the Pauli operators, also called Pauli matrices, and these operators are defined to act as identity on unlabeled registers so that the dot product $Y_i Y_j$ is understood to represent the tensor product $Y_i \otimes Y_j$). By removing these terms, the computing specification can be conformed to the available properties of the controllable quantum system. Some aspects of the particular perturbative gadgets technique used herein are described in more detail in a paper by Cao, Y., Babbush, R., Biamonte, J., and Kais, S. entitled "Towards Experimentally Realizable Hamiltonian Gadgets," e-print arXiv:1311.2555 (Nov. 11, 2013), incorporated herein by reference.

The third step includes applying "bit-flip" perturbative gadgets to reduce the locality of the Hamiltonian resulting in a 2-local Hamiltonian with only ZZ, XX and ZX couplings. Aspects of this step are described in greater detail below.

The following section describes an example of a system in which the compiling techniques and resulting quantum computation techniques described herein can be used. The sections after that describe the technical considerations on which the compiling techniques are based in more detail. In one section a second quantized formulation of the electronic structure problem is described. The next section describes the mapping of this problem to qubits. The next section describes the gadgets that we will use for interaction type and locality reduction. The next section includes a summary with description of various alternative embodiments. Finally, an appendix includes an example of the computations performed by the compiling procedure for a simple electronic system of molecular hydrogen in a minimal basis.

Example System

Referring to FIG. 1, one context for solution of a problem uses a quantum computer 130. The quantum computer 130 has a number of hardware elements (QB) 136 that are used to represent qubits of the quantum computation, and has coupling elements 137 that provide configurable and controllable coupling between the hardware elements 136, under the control of a controller 134. The array of coupled hardware elements 136 is referred to herein as a "quantum processor." The hardware elements 136 may be implemented, for example, using a circuitry capable of storing a quantum of a physical variable (e.g., magnetic flux) that is able to exist in a quantum superposition of two different distinguishable physical states (corresponding to a quantum state of an individual qubit). The hardware elements 136 may include some elements that correspond to "logical" qubits and some elements that correspond to "ancilla" qubits, as described in more detail below. In some implementations there are additional hardware components that distinguish the hardware elements for logical qubits from the hardware elements for ancilla qubits. For example, the hardware elements for all of the qubits may include circuitry configured to provide a magnetic field in proximity to other circuitry of the qubit, and the hardware elements for ancilla qubits may include circuitry that is configured to provide a stronger magnetic field than the circuitry for the logical qubits.

The controller 134 controls execution of a computing specification 132 using the array of coupled hardware elements 136. The controller 134 may be itself be implemented using any number of processors or other form of classical (i.e., non-quantum) programmable digital and/or analog control circuitry. The coupling elements 137 can be used to control the Hamiltonian according to which the qubits evolve over time, and in particular, can be used to control a time variation of the Hamiltonian in a quantum annealing procedure. After the quantum annealing procedure, physical quantities stored in the array of hardware elements 136 can be measured to yield a problem solution 140. In some embodiments, the hardware elements 136 include materials with particular properties such as superconductors, and may be arranged into devices such as Josephson junctions. For example, a hardware element 136 may include a device that has a superconducting loop interrupted by Josephson junctions known as a superconducting quantum interference device (SQUID).

Generally, in some examples, this quantum computer 130 is used in the solution of a problem, for example, a quantum chemistry problem, whose specification 110 is provided by a user 190, or in some alternatives is provided as the output of a system controller 180 (e.g., a computing system) that forms the problem specification 110 from another representation of the problem. This problem specification 110 does not, however, necessarily meet the limitations of the computing specification 132 that is able to be directly executed by the quantum computer 130. In particular, in this example, the quantum computer 130 requires a computing specification 132 that is compatible with the types of quantum interactions that are possible in the array of coupled hardware elements 136.

The approaches described herein are based on transformations of the problem specification 110 to form the computing specification 132 prior to control of the quantum computer 130 according to the computing specification 132. These transformations may be considered somewhat analogous to the compilation of a program written in a high-level computing language to form a low-level (e.g., assembly language) specification, which may then be further processed (e.g., into a binary executable file) before execution on a digital computer.

The transformation of the problem specification 110 to form the computing specification 132 is performed, in this example, on a digital computer having a processor 126 as well as program memory, referred to in FIG. 1 as the specification compiler 120. The processing of the problem specification 110 according to the procedures described in this application makes use of software 122, which includes processor instructions stored in the program memory (e.g., any non-transitory computer-readable medium) accessible by the processor 126. In some implementations, the software 122 includes a mapping module 123 for mapping the problem specification 110 to a qubit representation (e.g., using the Bravyi-Kitaev transformation), and a reduction module 125 for reducing the initial qubit representation (e.g., using perturbative gadgets) to a form that enables the specification compiler 120 to output a compatible computing specification 132.

In other examples, there may be additional system components and/or processing steps used to transform the output of the specification compiler 120 into a form appropriate for control of the hardware elements 136 in the quantum computer, or for further processing the problem solution 140 obtained from the time evolution of the quantum state of the hardware elements 136. In the case in which the problem specification 110 represents a quantum chemistry problem, the user 190 and/or the system controller 180 may use the problem solution 140 provided by the quantum computer 130 to determine chemical properties of a molecule based on the electronic structure determined as the problem solution 140.

Figure 2:
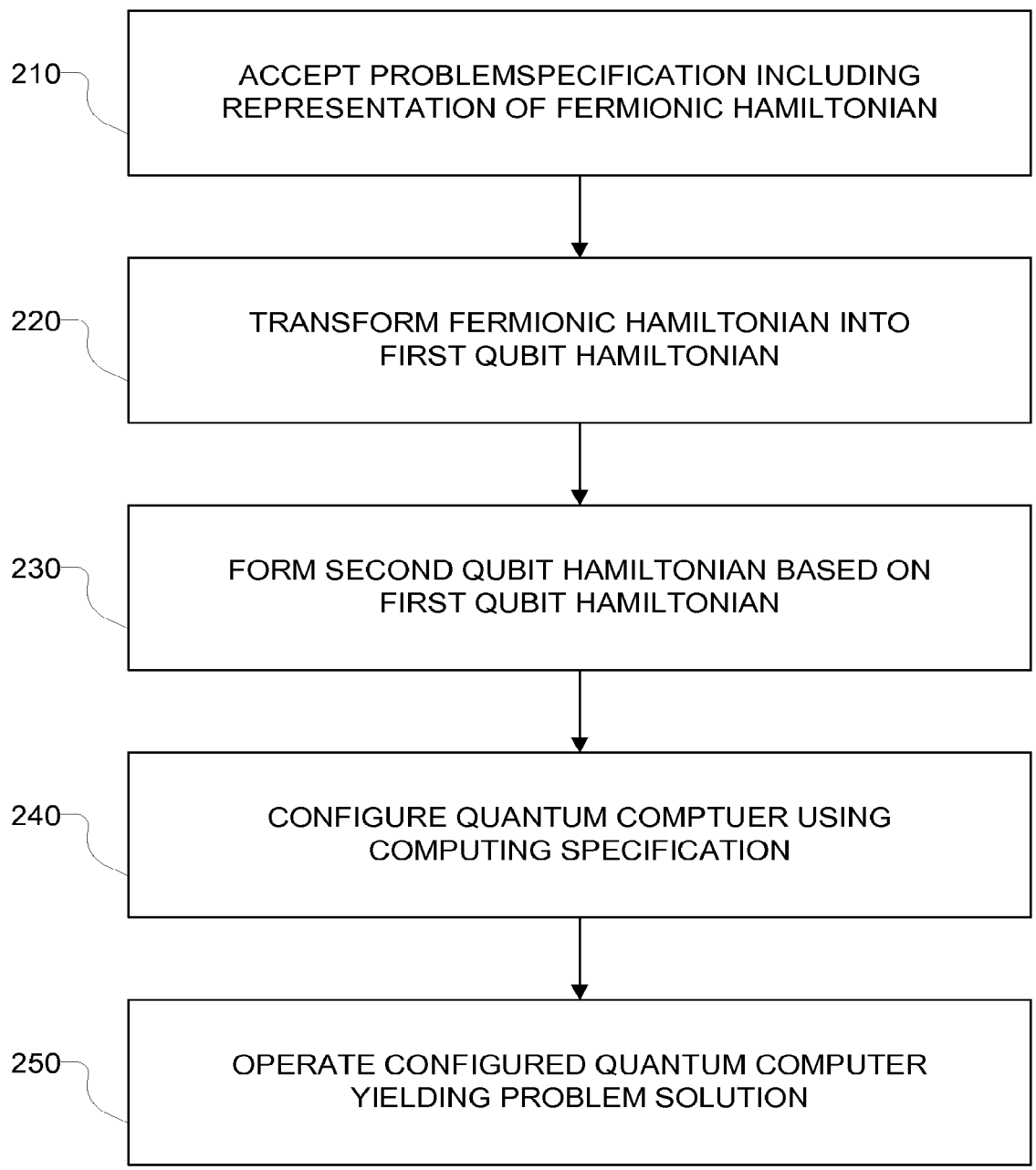
FIG. 2 is a flowchart of a procedure for operating the computing system.

Referring to FIG. 2, as well as FIG. 1, the overall process generally follows a number of steps. First, the problem specification 110 is accepted (step 210) by the specification compiler 120, for example from a user 190 or a system controller 180. The mapping module 123 transforms a fermionic Hamiltonian into a first qubit Hamiltonian (step 220). The reduction module 125 reduces the first qubit Hamiltonian to form (step 230) a second qubit Hamiltonian from which the computing specification 132 is generated. Having formed the transformed computing specification 132, the quantum computer 130 is configured (step 240) according to that computing specification 132. The quantum computer 130 is then operated (step 250) (under the control of the controller 134 according to the specification 132) until the problem solution 140 is obtained.

Second Quantization

For determining the electronic structure of a desired atom or molecule, the system controller 180, based on input from the user 190, may provide a problem specification 110 in the form of a Hamiltonian in a particular basis, which can be used to express interactions of electrons with a representation using second-quantized fermionic operators (i.e., annihilation and creation operators). The following is an example of a full configuration interaction (FCI) Hamiltonian in the occupation number basis. The example will be described in terms of various quantities and symbols (e.g., corresponding to states or operators) to be represented within the problem specification 110 in machine-readable form, and definitions will be provided to indicate what these quantities and symbols correspond to in terms of the quantum chemistry problem being specified. We define spin orbitals as the product of a spin function (representing either spin up or spin down) and a single-electron spatial function (usually molecular orbitals produced from a Hartree-Fock calculation). For example, in the case of molecular hydrogen there are two electrons and thus, two single-electron molecular orbitals, $|\psi_1\rangle$ and $|\psi_2\rangle$. Electrons have two possible spin states, $|\alpha\rangle$ (spin up) and $|\beta\rangle$ (spin down). The four spin orbitals for molecular hydrogen are therefore, $|\chi_0\rangle=|\psi_1\rangle|\alpha\rangle$, $|\chi_1\rangle=|\psi_1\rangle|\beta\rangle$, $|\chi_2\rangle=|\psi_2\rangle|\alpha\rangle$, and $|\chi_3\rangle=|\psi_2\rangle|\beta\rangle$.

The occupation number basis is formed from all possible configurations of n spin orbitals, which are each either empty or occupied by a single electron. We represent these vectors as a tensor product of individual spin orbitals expressed as $|f_{n-1} \ldots f_0\rangle$ where $f_j \in \mathbb{B}$ indicates the occupation of spin orbital $|\chi_j\rangle\mathbb{B}$. Any interaction between electrons can be represented as some combination of creation and annihilation operators $\alpha_j^\dagger$ and $\alpha_j$ for $\{j \in \mathbb{Z} \mid 0 \leq j \leq n\}$. Because fermionic wavefunctions must be antisymmetric with respect to particle label exchange, these operators must obey the fermionic anti-commutation relations, $$[\alpha_j, \alpha_k]_+ = [\alpha_j^\dagger, \alpha_k^\dagger]_+ = 0, [\alpha_j^\dagger, \alpha_k^\dagger]_+ = \delta_{jk} 1 \quad (1)$$

With these definitions the second-quantized molecular electronic Hamiltonian can be expressed as $$H = \sum_{i,j} h_{ij} a_i^\dagger a_j + \frac{1}{2} \sum_{i,j,k,l} h_{ijkl} a_i^\dagger a_j^\dagger a_k a_l. \quad (2)$$

The coefficients $h_{ij}$ and $h_{ijkl}$ are single and double electron overlap integrals which may be precomputed classically. The number of distinct integrals scale as $O(n^4$ in the number of spin orbitals n.

Qubit Representation

One aspect of the transformation performed by the specification compiler 120 is to represent the fermionic wavefunction in terms of qubits, which will ultimately be mapped to the hardware elements 136. The following is a direct mapping that maps an occupancy state to a qubit basis state. Using Pauli operators we can represent qubit raising and lowering operators as, $$Q_j^+ = |1\rangle\langle 0| = \frac{1}{2}(X_j - iY_j),$$

$$Q_j^- = |0\rangle\langle 1| = \frac{1}{2}(X_j + iY_j).$$

However, these operators do not obey the fermionic commutation relations given in Eq. 1. To express qubit operators that obey the commutation relations in Eq. 1, one option would be to use the Jordan-Wigner transformation.

However, the Jordan-Wigner transformation is not a scalable way to reduce electronic structure to an experimentally realizable Hamiltonian for AQC. This is because the Jordan-Wigner transformation introduces k-local interaction terms into the Hamiltonian and k grows linearly in the system size. While there are transformation procedures known as "perturbative gadgets" that allow for reductions in interaction order, using perturbative gadgets with the Jordan-Wigner transformation would lead to control precision increasing exponentially in k. Thus, the linear locality overhead introduced by the Jordan-Wigner transformation would translate into an exponential control precision requirement in the reduction.

An alternative mapping between the occupation number basis and qubit representation, known as the Bravyi-Kitaev transformation, introduces logarithmic locality overhead. By storing two pieces of information, creation and annihilation operators can be generated that act on qubits and obey the fermionic commutation relations. First, the occupancy of each orbital is stored. Second, parity information is stored so that for a pair of orbitals, it is possible to determine the parity of the occupancy of the orbitals that lie between them. This parity determines the phase that results from exchanging the occupancy of the two orbitals.

The occupation number basis stores the occupation directly in the qubit state (hence the name). This implies that occupancy is a fully local variable in this basis; one may determine the occupancy of an orbital by measuring a single qubit. However, this also implies that the parity information is completely non-local. It is this fact that determines the structure of the qubit creation and annihilation operators in the Jordan-Wigner transformation. Each such operator changes the state of a single qubit j (updating the occupancy information) but also acts on all qubits with indices less than j to determine the parity of their occupancy. This results in qubit operators, expressed as tensor products of Pauli matrices, that contain strings of Z operators whose length grows with the number of qubits. One could consider storing the parity information locally, so that the qubit basis states store sums of orbital occupancies. Then determination of parity requires a single qubit operation. However, updating occupancy information requires updating the state of a number of qubits that again grows with the number of qubits. Hence this "parity basis" construction would offer no advantage over the Jordan-Wigner transformation.

The Bravyi-Kitaev transformation offers a middle ground in which both parity and occupancy information are stored non-locally, so neither can be determined by measurement of a single qubit. Both parity and occupancy information can be accessed by acting on a number of qubits that scales as the logarithm of the number of qubits. This logarithmic scaling makes the mapping of electronic structure to a 2-local qubit Hamiltonian efficient.

Several subsets of qubits may be defined in which the parity and occupancy information may be stored (non-locally). The occupancy information is stored in an "update set," whereas the parity information is stored in a "parity set." These sets are distinct and their size is strictly bounded above by the logarithm base two of the number of qubits. The total number of qubits on which a qubit creation and annihilation operator may act can be a multiple of the logarithm base two of the number of qubits. However, this multiple is irrelevant from the point of view of the scalability of the construction.

Using the Bravyi-Kitaev transformation, the spin Hamiltonian for molecular hydrogen in the minimal (STO-3G) basis, may be expressed as $$H_{H_2} = f_0 1 + f_1 Z_0 + f_2 Z_1 + f_3 Z_2 + f_1 Z_0 Z_1 + f_4 Z_0 Z_2 + \\ f_5 Z_1 Z_3 + f_6 X_0 Z_1 X_2 + f_6 Y_0 Z_1 Y_2 + f_7 Z_0 Z_1 Z_2 + f_4 Z_0 Z_2 Z_3 + \\ f_3 Z_1 Z_2 Z_3 + f_6 X_0 Z_1 X_2 Z_3 + f_6 Y_0 Z_1 Y_2 Z_3 + f_7 Z_0 Z_1 Z_2 Z_3 \quad (4)$$

where the integral values (in Hartree) are, $f_0 = -0.81261, f_1 = 0.17120,$ $f_2 = 0.16862, f_3 = -0.22278, f_4 = 0.12055,$ $f_5 = 0.17435, f_6 = 0.04532, f_7 = 0.16587. \quad (5)$ In general, the Bravyi-Kitaev transformation applied to electronic structure produces an n-qubit Hamiltonian which is (log n)-local, and has $n^4$ real terms. This implies that each term has an even number of Y terms, or none, since the Pauli operators X and Z can be represented as matrices with only real numbers as elements (zero values on one diagonal and real values on the other diagonal), and the Pauli operator Y can be represented as a matrix containing imaginary numbers (zero values on the main diagonal and unit imaginary off-diagonal elements).

Hamiltonian Gadgets

Another aspect of the transformation performed by the specification compiler 120 is to ensure that the interactions between qubits represented in the computing specification 132 are compatible with the available types of couplings that exist between the hardware elements 136 physically representing those qubits. In order to embed electronic structure in a Hamiltonian that is physically realizable in the quantum computer 130, the specification compiler 120 performs a scalable procedure for transforming the (log n)-local qubit Hamiltonian into a 2-local Hamiltonian with only ZZ, XX and XZ interaction terms (the terms that correspond to realizable couplings between the hardware elements 136). In this section, the procedure is described in terms of tools known as "Hamiltonian gadgets," which allow the specification compiler 120 to simulate the target Hamiltonian with these interactions.

Hamiltonian gadgets provide a method for embedding the eigenspectra (and sometimes eigenvectors) of an n-qubit "target" Hamiltonian, denoted by $H_{target}$, in a restricted (typically low-energy) subspace of a more constrained (N>n)-qubit "gadget" Hamiltonian, denoted by $\tilde{H}$. To illustrate the general idea of gadgets, the following is an example of how the specification compiler 120 can be configured to embed a k-local Hamiltonian into a 2-local Hamiltonian. Suppose that we have a gadget Hamiltonian, $\tilde{H}$, which contains only 2-local terms that act on N=n+a qubits (n "logical" qubits and a "ancilla" qubits). Then, $$\tilde{H} = \sum_{i=1} f_i O_i, \tilde{H} | \psi_i \rangle = \tilde{\lambda}_i | \tilde{\psi}_i \rangle, \quad (6)$$

where $\{f_i\}$ are scalar coefficients, $\tilde{\lambda}_j$ and $|\tilde{\psi}_i\rangle$ are the eigenvectors and eigenvalues of $\tilde{H}$, and $\{O_i\}$ are the 2-local interaction terms of the physical Hamiltonian. The specification compiler 120 is configured to use interaction terms that are Hilbert-Schmidt orthogonal so that $Tr[O_i O_j] = 2^n \delta_{i,j}$. We now define an effective Hamiltonian that has support on the lowest $2^n$ states of the gadget Hamiltonian, $$H_{eff} \equiv \sum_{i=0}^{2^n-1} \tilde{\lambda}_i | \tilde{\psi}_i \rangle \langle \tilde{\psi}_i | = \sum_i f_i O_i \otimes \prod. \quad (7)$$

Here $\Pi$ is a projector onto a particular state (usually the lowest energy state) of the a ancilla qubits and the $\{O_i\}$ are a Hilbert-Schmidt orthogonal operator basis for operators on the space of the n logical qubits. In other words, the most general representation of $H_{eff}$ is an expansion of all possible tensor products acting on the logical qubits. In general, there is no reason why $f_i = 0$ on all non-2-local terms. Therefore a 2-local gadget on N=n+a qubits can embed a (k>2)-local, n-qubit Hamiltonian using a ancilla bits.

Perturbation theory techniques can be used enable the specification compiler 120 to generate Hamiltonian gadgets (due to QMA-Completeness of 2-Local Hamiltonian). A construction referred to herein as the "bit-flip construction," for reasons that will become clear below, is one such perturbation theory technique. Different types of perturbative gadgets may have specific advantages for transforming Hamiltonians for specific types of hardware elements 136 or other hardware components of the quantum computer being used. Generally, there is a rough tradeoff between the number of ancillae required and the amount of control precision required. For example, bit-flip gadgets require less control precision than certain other gadget constructions (but generally more ancillae).

The following example analyzes the spectrum of the gadget Hamiltonian, $\tilde{H} = H + V$ for the case that the norm of the perturbation Hamiltonian, V, is small compared to the spectral gap between the ground state and first excited state of the unperturbed Hamiltonian, H. To accomplish this we use the Green's function of $\tilde{H}$ $$\tilde{G}(z) \equiv (z1 - \tilde{H})^{-1} = \sum_j \frac{|\tilde{\psi}_j\rangle\langle\tilde{\psi}_j|}{z - \tilde{\lambda}_j}. \quad (8)$$

We also define G(z) using the same expression except with H instead of $\tilde{H}$. Further, let $H = L_+ \oplus L_-$ be the Hilbert space of $\tilde{H}$ where $L_+$ is the "high-energy" subspace spanned by eigenvectors of $\tilde{H}$ with eigenvalues $\tilde{\lambda} \geq \lambda_*$ and $L_-$ is the complementary "low-energy" subspace, spanned by eigenvectors of $\tilde{H}$ corresponding to eigenvalues of $\tilde{\lambda} < \lambda_*$. Let $\Pi_\pm$ correspond to projectors onto the support of $L_\pm$. In a representation of $H = L_+ \oplus L_-$, all the aforementioned operators V, H, $\tilde{H}$, G(z), $\tilde{G}(z)$ are block-diagonal so we employ the notation that $A_{\pm\pm} = \Pi_\pm A \Pi_\pm$ and, $$A = \begin{pmatrix} A_+ & A_{+-} \\ A_{-+} & A_- \end{pmatrix}. \quad (9)$$

Finally, we define the operator function known as the self-energy, $\Sigma_-(z) = z1_- - \tilde{G}_-^{-1}(z).$ We use this notation to restate the "gadget theorem."

Theorem 1 Assume that H has a spectral gap $\Delta$ around the cutoff $\lambda_*$; i.e. all of its eigenvalues are in $(-\infty, \lambda_-] \cup [\lambda_+, +\infty)$ where $\lambda_+ = \lambda_* + \Delta/2$ and $\lambda_* = \lambda_* - \Delta/2$. Assume that $\|V\| \leq \Delta/2$. Let $\varepsilon > 0$ be arbitrary. Assume there exists an operator $H_{eff}$ such that $\lambda(H_{eff}) \subset [c,d]$ for some $c < d < \lambda_* - \varepsilon$ and, moreover, the inequality $\|\Sigma_-(z) - H_{eff}\| \varepsilon$ holds for all $z \in [c-\varepsilon, d+\varepsilon]$. Then each eigenvalue $\tilde{\lambda}_j$ of $H_-$ is $\varepsilon$-close to the j th eigenvalue of $H_{eff}$.

Theorem 1 assures us that the eigenspectrum of the self-energy provides an arbitrarily good approximation to the eigenspectrum of the low-energy subspace of the gadget Hamiltonian. This is useful because the self-energy admits a series expansion, $$\Sigma_-(z) = H_- + V_- + \sum_{k=2}^{\infty} V_{-+} G_+ (V_+ G_+)^{k-2} V_{+-}. \quad (11)$$

Using $G_+ = (z-\Delta)^{-1} 1_+$ and $H_- = 0$, we focus on the range $z = O(1) \ll \Delta$ and find that, $$H_{eff} \approx V_- + \frac{1}{\Delta} \sum_{k=2}^{\infty} V_{-+} \left(\frac{V_+}{\Delta}\right)^{k-2} V_{+-}. \quad (12)$$

The specification compiler 120 can be configured to use this effective Hamiltonian to approximate the k-local target Hamiltonian, which we now specify. The terms in the target Hamiltonian will have a locality that scales logarithmically with the number of spin orbitals. We may express such a $$T = \bigotimes_{i=0}^{k-1} O_i : O_i \in \{X_i, Y_i, Z_i\} \forall i. \quad (13)$$

Gadgets can be applied term by term to reduce locality; however, this may not be the optimal procedure. In addition, the specification compiler 120 is configured to replace even tensor powers of the Y operator. A slightly more general form of term can be expressed as a target for gadgetization. We use the fact that it is only the commuting nature of the $\{O_i\}$ that is important for the gadget to function. We may therefore express a target term as a product of k commuting operators, which includes the special case in which it is a product of k operators acting on distinct tensor factors, $$T' = \prod_{i=0}^{k-1} O_i : [O_i, O_j] = 0 \forall \{i,j\} \quad (14)$$

Hence, we can represent the target Hamiltonian as a sum of r terms that are the product of k commuting operators, $$H_{target} = H_{else} + \sum_{s=1}^{r} \prod_{i=0}^{k-1} O_{s,i} \quad (15)$$

where all $\{O_{s,i}\}$ commute for a given s and $H_{else}$ can be realized directly by the physical Hamiltonian. While some formulations of bit-flip gadgets have gadgetized operators acting on distinct tensor factors, it is only necessary that the operators commute Their action on distinct tensor factors is sufficient but not necessary for the gadget construction. We take advantage of this property in order to transform YY terms appearing in the target Hamiltonian to other types of terms in the gadget Hamiltonian. This transformation is useful, for example, in implementations of the hardware elements 137 that do not permit couplings between hardware elements 137 that directly implement qubit interactions corresponding to YY terms. In particular, this transformation can be accomplished by making the substitution $Y_i Y_j \rightarrow -X_i X_j Z_i Z_j$. Since $X_i X_j$ commutes with $Z_i Z_j$, we can create this effective interaction with a bit-flip gadget. For instance, suppose we have the term $Z_0 Y_1 Y_2$. We gadgetize the term $A \cdot B \cdot C$ where $A = Z_0$, $B = -X_1 X_2$, and $C = Z_1 Z_2$ and all operators A, B, C commute. Another approach to removing YY terms is explained in the paper mentioned above by Cao, Y., Babbush, R., Biamonte, J., and Kais, S. entitled "Towards Experimentally Realizable Hamiltonian Gadgets," e-print arXiv:1311.2555 (Nov. 11, 2013), incorporated herein by reference.

We now describe the form of the penalty Hamiltonian that acts only on the ancilla qubits. Bit-flip gadgets introduce an ancilla system that has two degenerate ground-states, usually taken to be $|111 \ldots \rangle_u$ and $|000 \ldots \rangle_u$ where u indicates that these kets refer to an ancilla space. For each of the r terms we use a separate ancilla system of the form, $$H_s = \frac{\Delta}{2(k-1)} \sum_{0 \leq i < j \leq k-1} (1 - Z_{u_{s,i}} Z_{u_{s,j}}). \quad (16)$$

Again, we use u to indicate that operators act on an ancilla; e.g. the label $u_{3,2}$ indicates the ancilla corresponding to $O_{3,2}$ (the second operator in the third term). For each term we introduce an ancilla system connected by a complete graph with equal and negative edge weights. Thus, the ground state of the ancilla system is spanned by $|111 \ldots \rangle_u$ and $|000 \ldots \rangle_u$.

Next, we introduce the perturbation Hamiltonian, $$V = H_{else} + \Lambda + \mu \sum_{s=1}^{r} \sum_{i=0}^{k-1} O_{s,i} X_{u_{s,i}} \quad (17)$$

where $$\mu = \sqrt[k]{\frac{\Delta^{k-1}}{k!}}$$

and $\Lambda$ is a 2-local operator on logical bits, which will be discussed later. The effect of this Hamiltonian on the low energy subspace is to introduce virtual excitations into the high energy space that modify the low energy effective Hamiltonian. Only terms that start and end in the ground state contribute to the perturbation series for the self-energy (see, for example, FIG. 3A). Thus, the gadget Hamiltonian will produce the target term at order k in which a transition between the two degenerate ground states of the ancillae requires that each of the $X_u$ terms in the perturbation act exactly once to flip all r·k bits from one ground state to the other. Crucially, the order in which the ancillae are flipped does not matter since the operators $O_{s,i}$ commute for a given s. The complete gadget Hamiltonian is $$\tilde{H} = \tag{18}$$

$$\Lambda + H_{else} + \sum_{s=1}^{r} \left[ \mu \sum_{i=0}^{k-1} O_{s,i} X_{u_{s,i}} + \frac{\Delta}{2(k-1)} \sum_{0 \le i < j \le k-1} \left(1 - Z_{u_{s,i}} Z_{u_{s,j}}\right) \right].$$

and is related to the target Hamiltonian and effective Hamiltonian by $$\tilde{H}_- = H_{target} \otimes \Pi_- = H_{eff} \tag{19}$$

for the appropriate choice of $\Lambda$ and $\Delta \gg \|V\|$ where $\Pi_-$ projects onto the ancillae ground space, $$\Pi_- = |000\rangle\langle 000|_u + |111\rangle\langle 111|_u. \tag{20}$$

To illustrate the application of such a gadget and demonstrate how $\Lambda$ is chosen, an example of a procedure to scalably reduce the locality of molecular hydrogen and remove all Y terms is provided in the next section.

For the example $H_{target} = A \cdot B \cdot C + H_{else}$, the perturbation is $$V = \mu A X_a + \alpha B X_b + \mu C X_c + H_{else} + \Lambda. \tag{21}$$

Its components in the low energy subspace, as in the block diagonal representation of Eq. 9 is:

$$V_- = (H_{else} + \Lambda) \otimes (|000\rangle\langle 000|_u + |111\rangle\langle 111|_u). \tag{22}$$

The projection into the high energy subspace is:

$$V_+ = (H_{else} + \Lambda) \otimes \left( \sum_{[a,b,c] \in \mathbb{B}^3} |a,b,c\rangle\langle a,b,c|_u \right) - \tag{23}$$

$$V_- + \mu A \otimes (|0,1,0\rangle\langle 1,1,0|_u + |1,1,0\rangle$$

$$\langle 0,1,0|_u + |0,0,1\rangle\langle 1,0,1|_u + |1,0,1\rangle\langle 0,0,1|_u) +$$

$$\mu B \otimes (|1,0,0\rangle\langle 1,1,0|_u + |1,1,0\rangle\langle 1,0,0|_u +$$

$$|0,0,1\rangle\langle 0,1,1|_u + |0,1,1\rangle\langle 0,0,1|_u) +$$

$$\mu C \otimes (|1,0,0\rangle\langle 1,0,1|_u + |1,0,1\rangle$$

$$\langle 1,0,0|_u + |0,1,0\rangle\langle 0,1,1|_u + |0,1,1\rangle\langle 0,1,0|_u).$$

The projections coupling the low and high energy subspaces are:

$$V_{+-} = \mu A \otimes (|1,0,0\rangle\langle 0,0,0|_u + |0,1,1\rangle\langle 1,1,1|_u) + \tag{24}$$

$$\mu B \otimes (|0,1,0\rangle\langle 0,0,0|_u + |1,0,1\rangle\langle 1,1,1|_u) +$$

$$\mu C \otimes (|0,0,1\rangle\langle 0,0,0|_u + |1,1,0\rangle\langle 1,1,1|_u)$$

and $V_{-+} = (V_{+-})^\dagger$. Substituting these values into Eq. 12 we see that at order $k=3$ a term appears with the following form $$\frac{1}{\Delta^2} V_{-+} V_+ V_{+-} = \tag{25}$$

$$\frac{\mu^3}{\Delta^2} (ABC + ACB + BCA + CAB + BAC + CBA) \to ABC.$$

These terms arise because all ancilla qubits must be flipped and there are six ways of doing so, representing 3! (in general this will be k! for a gadget Hamiltonian with k ancilla qubits) combinations of the operators. These six terms are represented diagrammatically in FIG. 3A. Note that it is the occurrence of all orderings of the operators A, B and C that imposes the requirement that these operators commute Hence, in order to realize the desired term we see that $$\mu = \sqrt[k]{\frac{\Delta^{k-1}}{k!}}.$$

A few competing processes occur that contribute unwanted terms, but these terms either vanish with increasing spectral gap $\Delta$, or they can be removed exactly by introducing terms into the compensation term $\Lambda$. One way to compute $\Lambda$ is to evaluate the perturbation series to order k and choose $\Lambda$ so that problematic terms disappear.

Figure 3A:
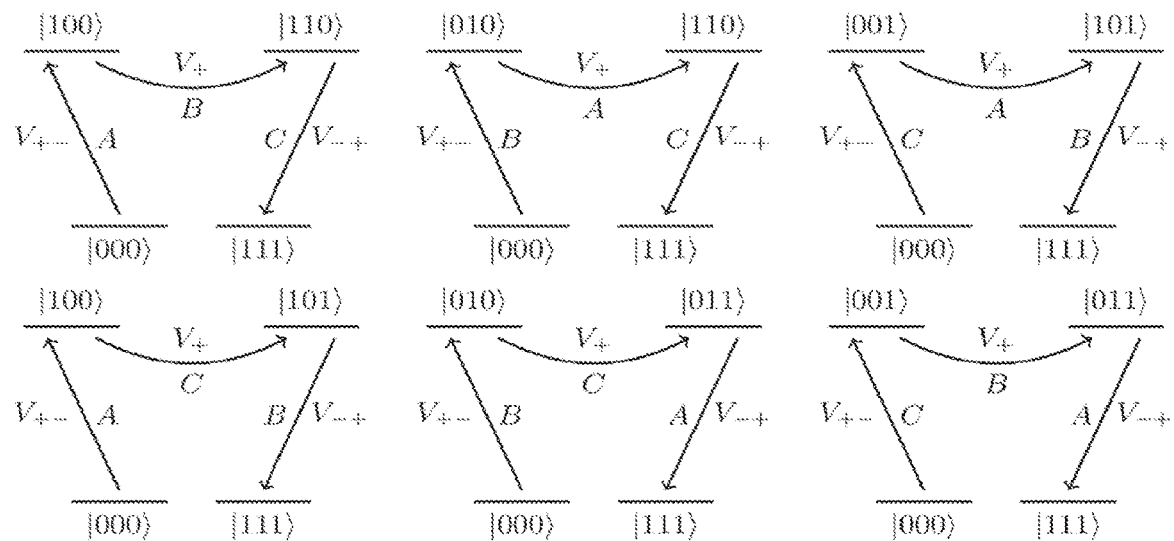
FIGS. 3A-3D are diagrams of processes that occur in different examples.
Figure 3B:
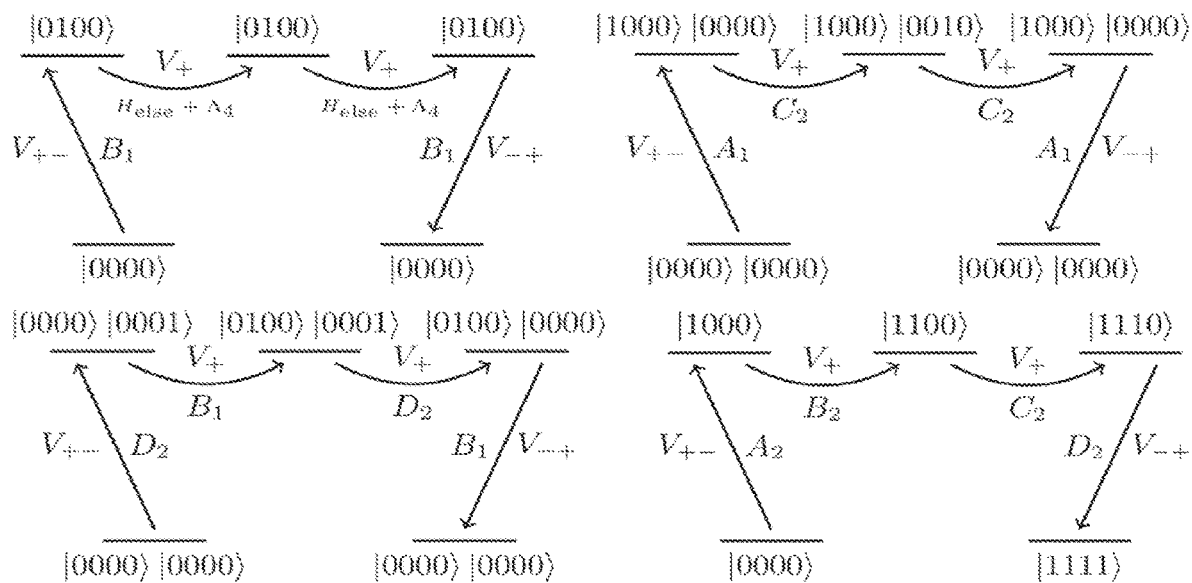

At higher orders we encounter "cross-gadget contamination," which means that processes occur involving multiple ancilla systems, causing operators from different terms to interact. For a 3-operator gadget, such terms will only contribute at order $O(\Delta^{-3})$. In reductions that require going to higher orders, these terms do not necessarily depend on $\Delta$, and so may introduce unwanted terms into the effective Hamiltonian. For instance, FIG. 3B shows an example of the four processes that occur at fourth order for a multiple term, 4-operator reduction. The diagrams involving multiple ancilla registers are examples of cross-gadget contamination.

However, if terms are factored into tensor products of operators that square to the identity (as is the case for products of Pauli operators, which is always possible), cross-gadget contamination can only contribute a constant shift to the energy, which can be compensated for in $\Lambda$. This is because any process contributing to the perturbation series that does not transition between the two different ground states must contain an even multiple of each operator, and if we choose to act on the non-ancilla qubits with operators that square to identity we obtain only a constant shift. Consider the two cross-gadget terms represented in these diagrams: $A_1 C_2^2 A_1 = A_1 1 A_1 = 1$ and $D_2 B_1 D_2 B_1 = (D_2 B_1)^2 = 1$. At even higher orders, individual cross-gadget terms might not equal a constant shift (i.e., the sixth order term $A_1 A_2 A_3 A_2 A_1 A_3$), but the occurrence of all combinations of operators and the fact that all Pauli terms either commute or anti-commute will guarantee that such terms disappear. In the sixth order example, if $[A_1, A_2] = 0$ then $A_1 A_2 A_3 A_2 A_1 A_3 = A_1 A_2 A_3 A_1 A_2 A_3 = (A_1 A_2 A_3)^2 = 1$, otherwise $[A_1, A_2]_+ = 0$, which implies that $A_1 A_2 A_3 A_2 A_1 A_3 + A_1 A_2 A_3 A_1 A_2 A_3 = 0$.

Example Problem: Molecular Hydrogen

The following is an example of a quantum chemistry problem that can be solved using the techniques described herein. We begin by showing how the specification compiler 120 could be configured to factor and transform the k-local molecular hydrogen Hamiltonian from Eq. 4 into a 4-local part and a 2-local part so that $H_{H_2} H_{4L} + H_{2L}$ where, $$H_{4L} = (f_4 Z_0 + f_3 Z_1) Z_2 Z_3 + (Z_1 + Z_1 Z_3)(f_6 X_0 X_2 + f_6 Y_0 Y_2 + f_7 Z_0 Z_2) \tag{26}$$

$$H_{2L} = f_0 1 + f_2 Z_1 + f_3 Z_2 + f_4 Z_0 Z_2 + f_5 Z_1 Z_3 + f_1 Z_0 (1 + Z_1). \tag{27}$$

In order to reduce $H_{H_2}$ to a 2-local ZZ/XX/XZ-Hamiltonian the specification compiler 120 further factors $H_{4L}$ to remove YY terms, $$H_{4L} = \underbrace{(f_4 Z_0 + f_3 Z_1) Z_2 Z_3}_{A_1} \underbrace{}_{B_1 C_1} + \underbrace{f_7 Z_0 Z_2 (Z_1 + Z_1 Z_3)}_{A_2 B_2 C_2} + \qquad (28)$$

$$\underbrace{f_6 X_0 X_2 (1 - Z_0 Z_2)(Z_1 + Z_1 Z_3)}_{A_3 \ B_3 \ C_3}$$

$$= A_1 B_1 C_1 + A_2 B_2 C_2 + A_3 B_3 C_3.$$

Within each term, the operators all commute so that $[A_i, B_i] = [A_i, C_i] = [B_i, C_i] = 0$. Factoring terms into commuting operators is performed in order for bit-flip gadgets to work correctly.

Each of the operators defined in Eq. 28 will have a corresponding ancilla qubit labelled to indicate the operator with which it is associated, e.g. the ancilla for operator $B_2$ has label $b_2$. The unperturbed Hamiltonian is a sum of fully connected ancilla systems in which each ancilla system corresponds to a term.

$$H_1 = \frac{9\Delta_1}{4} \mathbb{1} - \qquad (29)$$

$$\frac{\Delta_1}{4} (Z_{a_1} Z_{b_1} + Z_{a_1} Z_{c_1} + Z_{b_1} Z_{c_1} + Z_{a_2} Z_{b_2} + Z_{a_2} Z_{c_2} + Z_{b_2} Z_{c_2} +$$

$$Z_{a_3} Z_{b_3} + Z_{a_3} Z_{c_3} + Z_{b_3} Z_{c_3}).$$

The spectral gap and Hamiltonian have the subscript "1" to associate them with the first of two applications of perturbation theory. The ancilla system is perturbed with the Hamiltonian, $$V_1 = \mu_1 (A_1 X_{a_1} + B_1 X_{b_1} + C_1 X_{c_1} + A_2 X_{a_2} + B_2 X_{b_2} + \qquad (30)$$

$$C_2 X_{c_2} + A_3 X_{a_3} + B_3 X_{b_3} + C_3 X_{c_3}) + H_{2L} + \Lambda_1$$

where $$\mu_1 = \sqrt[3]{\frac{\Delta_1^2}{6}}$$

and $\Lambda_1$ is a 2-local compensation Hamiltonian acting on the logical qubits only. Later, $\Lambda_1$ will be selected by the specification compiler 120 to cancel extraneous terms from the perturbative expansion. The interaction terms involving A, B, and C will arise at third order ($V_{-+} V_+ V_{+-}$) from processes that involve a transition between the two degenerate ground states of the ancilla systems. This occurs at third order because to make the transition $|000\rangle \rightleftharpoons |111\rangle$, we must flip all three ancilla bits in each term by applying the operators $X_a$, $X_b$, and $X_c$. Since these operators are coupled to A, B, and C, sequential action of bit flip operators yields the appropriate term. Because the operators commute, the order of the bit flipping does not matter. We now show how the specification compiler 120 calculates the effective Hamiltonian using the perturbative expansion of the self-energy from Eq. 12.

Second Order

The only processes that start in the ground state and return to the ground state at second order are those that flip a single bit and then flip the same bit back. Thus, effective interactions are created between each operator and itself, $$-\frac{1}{\Delta_1} V_{-+} V_{+-} = \qquad (31)$$

$$-\frac{\mu_1^2}{\Delta_1} (A_1^2 + B_1^2 + C_1^2 + A_2^2 + B_2^2 + C_2^2 + A_3^2 + B_3^2 + C_3^2) = -\sqrt[3]{\frac{\Delta_1}{36}}$$

$$[(9 + f_3^2 + f_4^2 + f_6^2 + f_7^2)\mathbb{1} + 2 f_3 f_4 Z_0 Z_1 - 2 Z_0 Z_2 + 4 Z_3].$$

Figure 3C:
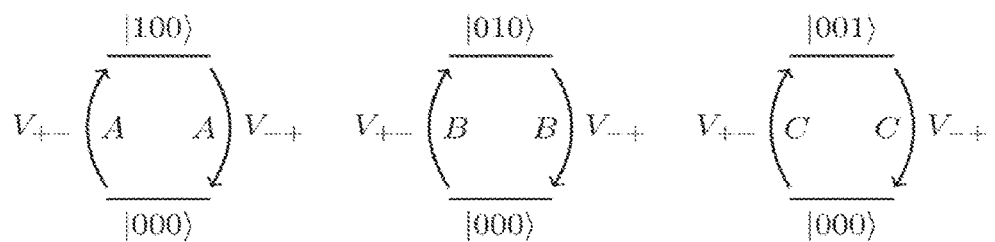

These processes are shown in FIG. 3C.

The second order effective Hamiltonian at large $\Delta_1$ is, $$H_{eff}^{(2)} = H_{2L} + \Lambda_1 - \qquad (32)$$

$$\sqrt[3]{\frac{\Delta_1}{36}} [(9 + f_3^2 + f_4^2 + f_6^2 + f_7^2)\mathbb{1} + 2 f_3 f_4 Z_0 Z_1 - 2 Z_0 Z_2 + 4 Z_3] +$$

$$O(\Delta_1^{-2}).$$

Third Order

The target Hamiltonian terms appears at third order from processes that transition between degenerate ground states. However, there is also an additional, unwanted process that occurs at this order. This competing process involves one interaction with $H_{2L}$ and $\Lambda_1$ in the high-energy subspace, $$\frac{1}{\Delta_1^2} V_{-+} V_+ V_{+-}^{(1)} = \qquad (33)$$

$$\frac{\mu_1^2}{\Delta_1^2} [A_1 (H_{2L} + \Lambda_1) A_1 + B_1 (H_{2L} + \Lambda_1) B_1 + C_1 (H_{2L} + \Lambda_1) C_1 +$$

$$A_2 (H_{2L} + \Lambda_1) A_2 B_2 (H_{2L} + \Lambda_1) B_2 + C_2 (H_{2L} + \Lambda_1) C_2 +$$

$$A_3 (H_{2L} + \Lambda_1) A_3 + B_3 (H_{2L} + \Lambda_1) B_3 + C_3 (H_{2L} + \Lambda_1) C_3].$$

Figure 3D:
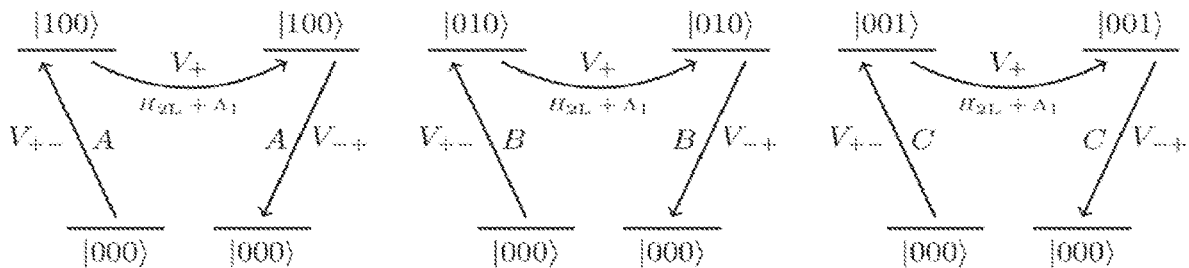

These processes are illustrated diagrammatically in FIG. 3D.

The process we want occurs with the ancilla transition $|000\rangle \rightleftharpoons |111\rangle$ which flips all three bits (for each term separately since they have different ancillae). There are $3! = 6$ possible ways to flip the bits for each term, (these processes are illustrated in FIG. 3A), $$\frac{1}{\Delta_1^2} V_{-+} V_+ V_{+-}^{(2)} = 6 \frac{\mu_1^3}{\Delta_1^2} (A_1 B_1 C_1 + A_2 B_2 C_2 + A_3 B_3 C_3) = \qquad (34)$$

$$A_1 B_1 C_1 + A_2 B_2 C_2 + A_3 B_3 C_3.$$

Because $H_{2L}$ has no $\Delta_1$ dependence and $\mu_1$ is order $O(\Delta_1^{2/3})$, terms such as $(\mu_1^2 / \Delta_1^2) A_1 H 2L A_1$ will vanish in the limit of large $\Delta_1$; therefore, the third order effective Hamiltonian is, $$H_{eff}^{(3)} = H_{2L} + \Lambda_1 - \qquad (35)$$

$$\sqrt[3]{\frac{\Delta_1}{36}} [(9 + f_3^2 + f_4^2 + f_6^2 + f_7^2)\mathbb{1} + 2 f_3 f_4 Z_0 Z_1 - 2 Z_0 Z_2 + 4 Z_3] +$$

$$\frac{\mu_1^2}{\Delta_1^2} (A_1 \Lambda_1 A_1 + B_1 \Lambda_1 B_1 + C_1 \Lambda_1 C_1 + A_2 \Lambda_1 A_2 + B_2 \Lambda_1 B_2 +$$

$$C_2 \Lambda_1 C_2 + A_3 \Lambda_1 A_3 + B_3 \Lambda_1 B_3 + C_3 \Lambda_1 C_3) +$$

$$A_1 B_1 C_1 + A_2 B_2 C_2 + A_3 B_3 C_3$$

with error $O(\Delta_1^{-3})$. We see that if $$\Lambda_1 = \frac{1}{\Delta_1} V_{-+} V_{+-}$$

then the unwanted contribution at third order will go to zero in the limit of large $\Delta_1$ and the second order term will cancel exactly with $\Lambda_1$. Thus, $$H_{eff}^{(3)} \approx H_{2L} + A_1 B_1 C_1 + A_2 B_2 C_2 + A_3 B_3 C_3 \quad (36)$$

$$H_{H_2} \to H_1 + V_1 \quad (37)$$

where "$\to$" denotes an embedding. There are still 3-local terms remaining in $V_1$, $$V_1 = \mu_1(f_4 Z_0 + f_3 Z_1)X_{a_1} + \mu_1 X_2(X_{b_1} + X_{b_2}) + \mu_1 Z_3 X_{c_1} + \quad (38)$$

$$\mu_1 f_7 Z_0 X_{a_2} + \mu_1 Z_1(Z_{c_2} + X_{c_3}) + \mu_1 X_{b_3} + \underbrace{\mu_1 Z_1}_{A_4} \underbrace{Z_3}_{B_4} \underbrace{(X_{c_2} + X_{c_3})}_{C_4} +$$

$$\underbrace{\mu_1 f_6 X_0}_{A_5} \underbrace{X_2}_{B_5} \underbrace{X_{a_3}}_{C_5} + \underbrace{(-\mu_1)Z_0}_{A_6} \underbrace{Z_2}_{B_6} \underbrace{X_{b_3}}_{C_6} + H_{2L} + \Lambda_1.$$

With this notation we reorganize the Hamiltonian a final time, so that $H_{H_2} \to H_{2L} \, H_{3L}$ $$H_{3L} = A_4 B_4 C_4 + A_5 B_5 C_5 + A_6 B_6 C_6 \quad (39)$$

$$H_{2L} = \quad (40)$$

$$\left(f_0 + \frac{9\Delta_1}{4}\right)1 + f_2 Z_1 + f_3 Z_2 + f_4 Z_0 Z_2 + f_5 Z_1 Z_3 + f_1 Z_0 (1 + Z_1) -$$

$$\frac{\Delta_1}{4}(Z_{a_1} Z_{b_1} + Z_{a_1} Z_{c_1} + Z_{b_1} Z_{c_1} + Z_{a_2} Z_{b_2} + Z_{a_2} Z_{c_2} +$$

$$Z_{b_2} Z_{c_2} + Z_{a_3} Z_{b_3} + Z_{a_3} Z_{c_3} + Z_{b_3} Z_{c_3}) +$$

$$\sqrt[3]{\frac{\Delta_1^2}{6}} [(f_4 Z_0 + f_3 Z_1)X_{a_1} + Z_3 X_{c_1} + f_7 Z_0 X_{a_2} +$$

$$X_2(X_{b_1} + X_{b_2}) + X_{b_3} + Z_1(X_{c_2} + X_{c_3})] +$$

$$\sqrt[3]{\frac{\Delta_1}{36}} [(9 + f_3^2 + f_4^2 + f_6^2 + f_7^2)1 + 2f_3 f_4 Z_0 Z_1 - 2Z_0 Z_2 + 4Z_3].$$

The third order gadget used to reduce $H_{3L}$ takes the same form as before except with the term labels 1, 2, 3 exchanged for the term labels 4, 5, 6. The components of the final gadget Hamiltonian are $$H_2 = \frac{9\Delta_2}{4} 1 - \frac{\Delta_2}{4}(Z_{a_4} Z_{b_4} + Z_{a_4} Z_{c_4} + Z_{b_4} Z_{c_4} + Z_{a_5} Z_{b_5} + \quad (41)$$

$$Z_{a_5} Z_{c_5} + Z_{b_5} Z_{c_5} + Z_{a_6} Z_{b_6} + Z_{a_6} Z_{c_6} + Z_{b_6} Z_{c_6})$$

and $$V_2 = \mu_2(A_4 X_{a_4} + B_4 X_{b_4} + C_4 X_{c_4} + A_5 X_{a_5} + B_5 X_{b_5} + \quad (42)$$

$$C_5 X_{c_5} + A_6 X_{a_6} + B_6 X_{b_6} + C_6 X_{c_6}) + H_{2L} + \Lambda_2$$

where $\mu_2 = \sqrt[3]{\frac{\Delta_2^2}{6}}$ and $$\Lambda_2 = \frac{\mu_2^2}{\Delta_2}(A_4^2 + B_4^2 + C_4^2 + A_5^2 + B_5^2 + C_5^2 + A_6^2 + B_6^2 + C_6^2) \quad (43)$$

$$= \sqrt[3]{\frac{\Delta_2}{6}} \left[\frac{7}{\sqrt[3]{6}} + \Delta_1^{4/3}\left(\frac{1}{3} + \frac{f_6^2}{6}\right)\right] 1 + \sqrt[3]{\frac{2\Delta_2}{9}} X_{c_2} X_{c_3}.$$

Figure 4:
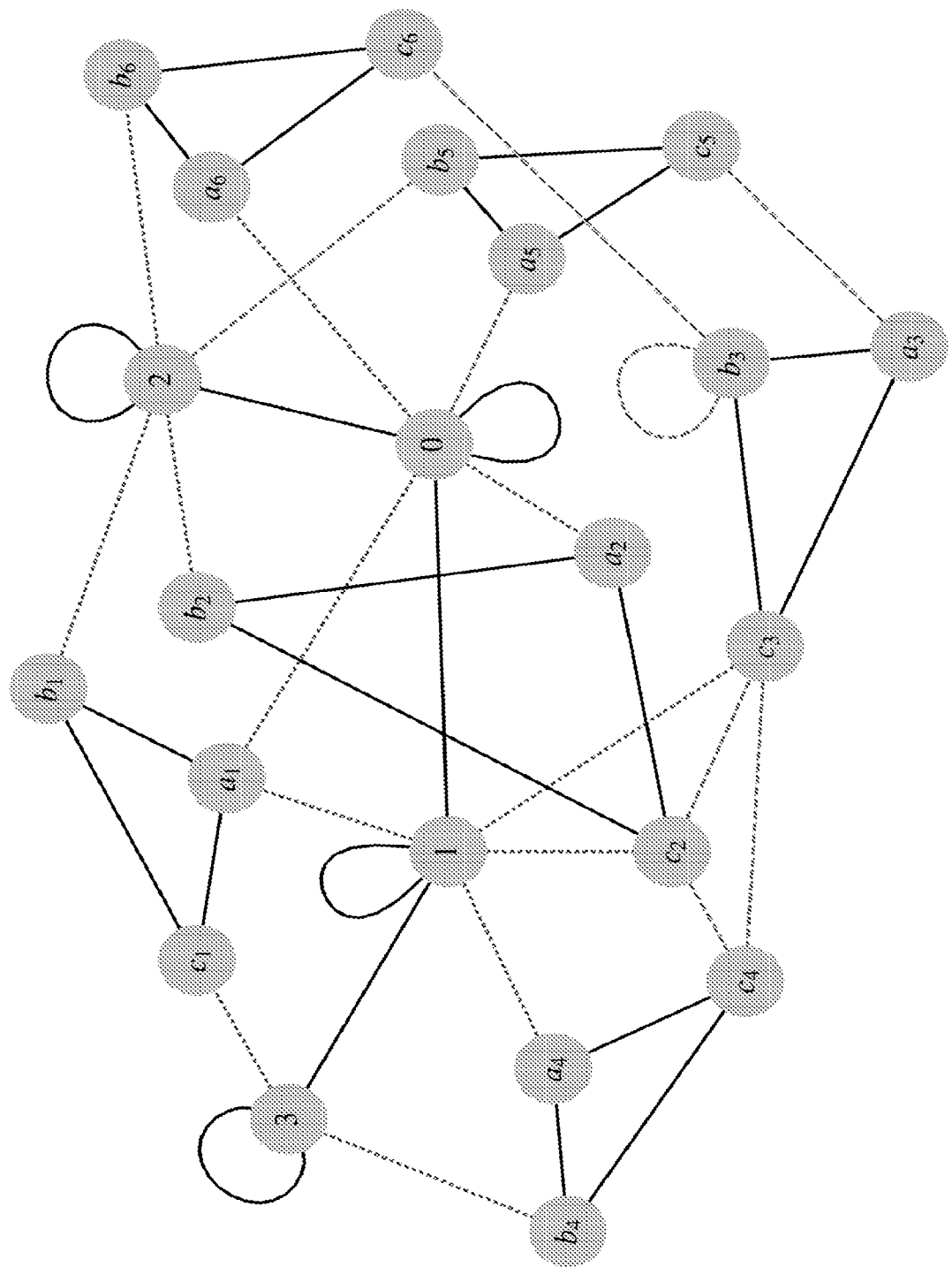
FIG. 4 is an interaction graph for an embedded molecular Hydrogen Hamiltonian.

This time the spectral gap and Hamiltonian have the subscript "2" to associate them with the second application of perturbation theory. We have thus shown the embedding $H_{H_2} \to H_2 + V_2$. An interaction graph for the embedded Hamiltonian is shown in FIG. 4.

Alternatives

We have presented a procedure for configuring the specification compiler 120 for mapping any molecular electronic structure problem to a 2-local Hamiltonian containing only ZZ, XX and XZ terms. The procedure is scalable in the sense that the computational resources (e.g., qubits, control precision, graph degree) scale polynomially in the number of spin orbitals. The specification compiler 120 uses perturbative gadgets that embed the entire target Hamiltonian (as opposed to just the ground state), thus guaranteeing that the eigenvalue gap is conserved under the reduction. Furthermore, the specification compiler 120 applies bit-flip gadgets to remove terms corresponding to couplings that are not available quantum computer, such as YY terms. The resulting Hamiltonian included in the computing specification 132 is suitable for implementation in hardware elements 136 using techniques such as superconducting systems, quantum dots, and other systems of artificial spins with the correct engineered interactions.

Further reduction of the types of interactions present in the computing specification 132 is possible, to either ZZ and XX terms or ZZ and XZ terms, for example. This makes the required interactions for simulating electronic structure Hamiltonians equivalent to the requirements of universal adiabatic quantum computation. However, repeated reduction of the Hamiltonian results in more stringent precision requirements. The chosen target set of interactions strikes a balance between control precision and a reasonable set of distinct types of controllable interactions. The techniques described herein could also be applied to interacting fermion problems on the lattice. However, in that case it is possible to improve beyond the Bravyi-Kitaev mapping and exploit the locality of the interactions to directly obtain Hamiltonians whose locality is independent of the number of orbitals.

Any of a variety of techniques can be used to read out energy eigenvalues from the quantum computer 130, including using the tunneling spectroscopy of a probe qubit. In this scheme, a probe qubit is coupled to a single qubit of the simulation. Tunneling transitions allow the probe qubit to flip when the energy bias of the probe is close to an eigenvalue of the original system. Hence detection of these transitions reveals the eigenspectrum of the original system. Thus, the eigenspectra of the molecular systems embedded into the spin Hamiltonian can be directly measured using the techniques described herein. Alternatively, the energy could be evaluated by determining the expectation value of each term in the Hamiltonian via projective measurements.

There exist classical algorithms, such as DMRG (density matrix renormalization group) and related tensor network methods, and there are complexity and approximability results pertaining to minimal resource model Hamiltonians. Using the techniques described herein, problems in chemistry can be reduced to such models, and solution of such problems can be leveraged to make advances in electronic structure theory.

It is to be understood that the foregoing description is intended to illustrate and not to limit the scope of the invention, which is defined by the scope of the appended claims. Other embodiments are within the scope of the following claims.

What is claimed is:

1. A method of compiling a quantum problem for execution on a quantum processor, the method comprising:
reading a problem specification, the problem specification corresponding to a fermionic Hamiltonian associated with a system of one or more fermion, the system having a plurality of spin orbitals;
generating a first computing specification from the problem specification, the first computing specification comprising a first plurality of qubits, the first plurality of qubits encoding parity and occupancy information of the plurality of spin orbitals non-locally, wherein generating the first computing specification comprises representing second-quantized fermionic operators as interactions between qubits of the plurality of qubits;
generating a second computing specification from the first computing specification, the second computing specification comprising a plurality of logical qubits and a plurality of ancilla qubits, wherein generating the second computing specification comprises substituting interactions between ancilla qubits of the plurality of ancilla qubits for interactions between qubits of the plurality of qubits that are unavailable on the quantum processor.

2. The method of claim 1, wherein generating the first computing specification comprises applying a Bravyi-Kitaev transformation to the Hamiltonian.

3. The method of claim 1, wherein the first plurality of qubits comprises a first subset encoding parity information and a second, disjoint, subset encoding occupancy information.

4. The method of claim 3, wherein the first subset contains a number of qubits no greater than $\log_2$ of a total number of qubits in the first plurality of qubits.

5. The method of claim 3, wherein the second subset contains a number of qubits no greater than $\log_2$ of a total number of qubits in the first plurality of qubits.

6. The method of claim 1, wherein the first computing specification corresponds to a first Hamiltonian, the second computing specification correspond to a second Hamiltonian, and the second Hamiltonian embeds the first Hamiltonian.

7. The method of claim 6, wherein the second Hamiltonian is 2-local and the first Hamiltonian is greater than 2-local.

8. The method of claim 1, wherein said generating the second computing specification comprises removing couplings unavailable on the quantum processor.

9. The method of claim 1, where said generating the second computing specification comprises removing interactions that violate a locality constraint on the quantum processor.

10. The method of claim 1, wherein the second-quantized fermionic operators comprise annihilation and creation operators.

11. The method of claim 1, further comprising:
executing the second computing specification on the quantum processor.

12. A non-transitory computer readable storage medium having program instructions embodied therewith, the program instructions executable by a processor to cause the processor to perform a method comprising:
reading a problem specification, the problem specification corresponding to a fermionic Hamiltonian associated with a system of one or more fermion, the system having a plurality of spin orbitals;
generating a first computing specification from the problem specification, the first computing specification comprising a first plurality of qubits, the first plurality of qubits encoding parity and occupancy information of the plurality of spin orbitals non-locally, wherein generating the first computing specification comprises representing second-quantized fermionic operators as interactions between qubits of the plurality of qubits;
generating a second computing specification from the first computing specification, the second computing specification comprising a plurality of logical qubits and a plurality of ancilla qubits, wherein generating the second computing specification comprises substituting interactions between ancilla qubits of the plurality of ancilla qubits for interactions between qubits of the plurality of qubits that are unavailable on the quantum processor.

13. A system comprising:
a quantum processor;
a computer comprising a processor adapted to perform a method comprising:
reading a problem specification, the problem specification corresponding to a fermionic Hamiltonian associated with a system of one or more fermion, the system having a plurality of spin orbitals;
generating a first computing specification from the problem specification, the first computing specification comprising a first plurality of qubits, the first plurality of qubits encoding parity and occupancy information of the plurality of spin orbitals non-locally, wherein generating the first computing specification comprises representing second-quantized fermionic operators as interactions between qubits of the plurality of qubits;
generating a second computing specification from the first computing specification, the second computing specification comprising a plurality of logical qubits and a plurality of ancilla qubits, wherein generating the second computing specification comprises substituting interactions between ancilla qubits of the plurality of ancilla qubits for interactions between qubits of the plurality of qubits that are unavailable on the quantum processor;
provide the second computing specification for execution on the quantum processor.

* * * * *